United States Patent
Bajaj et al.

(10) Patent No.: US 11,683,126 B2
(45) Date of Patent: *Jun. 20, 2023

(54) DATA PACKET TRAFFIC CONDITIONING THROUGH MULTIPLE LOSSY DATA PATHS WITH FORWARD ERROR CORRECTION

(71) Applicant: Versa Networks, Inc., San Jose, CA (US)

(72) Inventors: Kapil Bajaj, Fremont, CA (US); Apurva Mehta, Cupertino, CA (US)

(73) Assignee: VERSA NETWORKS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,809

(22) Filed: Mar. 31, 2021

(65) Prior Publication Data

US 2022/0321262 A1  Oct. 6, 2022

(51) Int. Cl.
 *H04L 1/00* (2006.01)
 *H04L 12/28* (2006.01)
 (Continued)

(52) U.S. Cl.
 CPC ........ *H04L 1/0089* (2013.01); *H04L 12/2854* (2013.01); *H04L 43/0829* (2013.01); *H04L 43/0882* (2013.01); *H04L 43/0888* (2013.01); *H04L 43/0894* (2013.01); *H04L 43/16* (2013.01)

(58) Field of Classification Search
 CPC .............. H04L 1/0089; H04L 12/2854; H04L 43/0829; H04L 43/0882; H04L 43/0888; H04L 43/0894; H04L 43/16
 See application file for complete search history.

(56) References Cited

U.S. PATENT DOCUMENTS

| 10,218,629 B1 | 2/2019 | An et al. |
| 2005/0002416 A1 | 1/2005 | Belotserkovsky et al. |

(Continued)

FOREIGN PATENT DOCUMENTS

| JP | 2016092441 A | 5/2016 |
| WO | 2017207393 A1 | 12/2017 |

OTHER PUBLICATIONS

Non Final Office Action (U.S. Appl. No. 17/219,795) dated May 25, 2022, 46 pgs.

(Continued)

*Primary Examiner* — Dhairya A Patel
*Assistant Examiner* — Eui H Kim
(74) *Attorney, Agent, or Firm* — Loza & Loza, LLP

(57) ABSTRACT

Embodiments herein disclose conditioning traffic through multiple data paths of a Software-Defined Wide Area Network (SD-WAN). Some embodiments include monitoring available paths through an SD-WAN to reach a destination node, determining a quality score for packets to the destination node on a first path of the available paths, sending a data packet sequence to the destination node on the first path, generating a forward error correction (FEC) packet for the packet sequence, and sending the FEC packet to the destination node on a second path of the available paths in response to the quality score being less than a quality threshold.

15 Claims, 12 Drawing Sheets

(51) Int. Cl.
*H04L 43/0829* (2022.01)
*H04L 43/16* (2022.01)
*H04L 43/0888* (2022.01)
*H04L 43/0894* (2022.01)
*H04L 43/0882* (2022.01)

(56) References Cited

U.S. PATENT DOCUMENTS

| | | | |
|---|---|---|---|
| 2009/0262646 A1 | 10/2009 | Ramakrishnan et al. | |
| 2009/0276686 A1* | 11/2009 | Liu | H04L 1/0045 714/776 |
| 2011/0116367 A1* | 5/2011 | Mang | H04L 41/0663 370/228 |
| 2012/0005549 A1 | 1/2012 | Ichiki et al. | |
| 2015/0171893 A1* | 6/2015 | Vaananen | G06F 11/10 714/819 |
| 2017/0338908 A1* | 11/2017 | Chebib | H04L 1/1812 |
| 2019/0342426 A1* | 11/2019 | Momchilov | H04L 47/624 |
| 2020/0382625 A1* | 12/2020 | Medard | H04L 1/0076 |
| 2020/0412483 A1* | 12/2020 | Tan | H04L 1/0041 |
| 2021/0092062 A1* | 3/2021 | Dhanabalan | H04L 47/805 |
| 2021/0360650 A1 | 11/2021 | Huang | |
| 2022/0021612 A1* | 1/2022 | Zhou | H04L 47/20 |
| 2022/0217089 A1 | 7/2022 | Liu et al. | |

OTHER PUBLICATIONS

Non Final Office Action (U.S. Appl. No. 17/219,813) dated Apr. 28, 2022, 15 pgs.
Notice of Allowance (U.S. Appl. No. 17/219,813) dated Sep. 1, 2022, 15pgs.
Final Office Action (U.S. Appl. No. 17/219,795) dated Nov. 14, 2022, 58 pgs.
Non-Final Office Action (U.S. Appl. No. 17/219,795) dated May 5, 2023, 67 pgs.

* cited by examiner

DATA PACKET TRAFFIC CONDITIONING THROUGH MULTIPLE LOSSY DATA PATHS WITH FORWARD ERROR CORRECTION

TECHNICAL FIELD

The embodiments herein relate to data communication through multiple network paths between nodes and, more particularly, to conditioning the traffic flow through the multiple paths with forward error correction.

BACKGROUND

Network data communications have moved beyond asynchronous text and file transfer traffic to time-sensitive traffic such as streaming and interactive communications. At the same time many of the resources being used to carry the data are virtualized. A VNF (Virtual Network Function) may take the place of a hardware router. An SD-WAN (Software-Defined Wide Area Network) may take the place of dedicated physical network resources. An SD-WAN may have at least one designated hub node for each of the branch nodes. The hub nodes are able to act as a gateway to a plurality of branch nodes. The, branch nodes themselves may have direct access to the Internet through one or more WAN links as well as through the hub nodes.

Real-time applications, frequently used for streaming and interactive communications, such as voice and video conference applications including VoIP (Voice over Internet Protocol), have more stringent delay requirements than other data transmissions. As a result, retransmission of a lost packet can cause noticeable delay or lag in a user's experience. Application traffic, such as Software as a Service (SaaS) applications and Internet-hosted applications in which the application and possibly also user data are remotely hosted, such as Microsoft Office 365 ® and Dropbox® applications, etc. may also be sensitive to communication delay. These applications may be accessed by clients through, for example, the Internet, an intranet, a private LAN (Local Area Network), or through a cloud, such as a public cloud, a private cloud, and/or a hybrid cloud.

SUMMARY

Embodiments herein disclose conditioning traffic through multiple data paths of a Software-Defined Wide Area Network (SD-WAN). Some embodiments include monitoring available paths through an SD-WAN to reach a destination node, determining a quality score for packets to the destination node on a first path of the available paths, sending a data packet sequence to the destination node on the first path, generating a forward error correction (FEC) packet for the packet sequence, and sending the FEC packet to the destination node on a second path of the available paths in response to the quality score being less than a quality threshold.

Further embodiments include determining a link utilization for the first path and wherein sending the FEC packet comprises sending the FEC packet only if the link utilization on the first path is less than a high utilization threshold. Further embodiments include determining a link utilization for the second path and wherein sending an FEC packet comprises sending the FEC packet only if the link utilization on the second path is less than a high utilization threshold. Further embodiments include determining a quality score for packets to the destination node on the second path, replicating the FEC packet, and sending the replicated FEC packet to the destination node on the first path when the quality score on the second path is below the quality threshold.

5. Further embodiments include determining a link utilization for the second path and wherein sending the replicated FEC packet comprises sending the replicated FEC packet only if the link utilization on the second path is less than a high utilization threshold. Further embodiments include not sending the replicated FEC packet when the link utilization on the second path is greater than a high threshold.

In further embodiments, generating the FEC packet comprises selecting a number of packets of the data packet sequence based on the quality score and wherein generating the FEC packet comprises generating the FEC packet for the selected number of packets. Further embodiments include attaching a header to the FEC packet to indicate the selected number of packets. Further embodiments include attaching a header to the data packets configured to indicate an FEC packet. In further embodiments the FEC packet is an exclusive OR parity packet. In further embodiments, the quality score is a packet loss score.

Further embodiments include sending a second data packet sequence to the destination node on the second path and wherein the FEC packet is related to at least a portion of the second data sequence. Further embodiments include sending a second data packet sequence to the destination node on the second path and wherein the FEC packet is related to at least a portion of the second data sequence.

In further embodiments, sending a second data packet sequence comprises allocating the first and the second data packet sequences to the first and second paths based on link utilization of the first and second paths.

Some embodiments pertain to a network node that includes a path monitoring module configured to monitor available paths through an SD-WAN to reach a destination node, and to determine a quality score for packets to the destination node on a first path of the available paths, and a traffic conditioning module configured to send a data packet sequence to the destination node on the first path, to generate a forward error correction (FEC) packet for the data packet sequence, and to send the FEC packet to the destination node on a second path of the available paths in response to the quality score being less than a quality threshold.

in further embodiments, the path monitoring module is further to determine a link utilization for the first path and wherein the traffic conditioning module is further to send the FEC packet only if the link utilization on the first path is less than a high utilization threshold. In further embodiments, the traffic monitoring module is further to replicate the FEC packet and send the replicated FEC packet to the destination node on the first path when the quality score on the second path is below the quality threshold.

Some embodiments pertain to a non-transitory computer-readable storage medium containing program instructions, wherein execution of the program instructions by the computer causes the computer to perform operations comprising monitoring available paths through an SD-WAN to reach a destination node, determining a quality score for packets to the destination node on a first path of the available paths, sending a data packet sequence to the destination node on the first path, generating a forward error correction (FEC) packet for the packet sequence, and sending the FEC packet to the destination node on a second path of the available paths in response to the quality score being less than a quality threshold.

Further embodiments include determining a link utilization for the second path and wherein sending the replicated FEC packet comprises sending the replicated FEC packet only if the link utilization on the second path is less than a high utilization threshold. Further embodiments include not sending the replicated FEC packet when the link utilization on the second path is greater than a high threshold.

BRIEF DESCRIPTION OF THE FIGURES

The embodiments herein will be better understood from the following detailed description with reference to the drawing figures, in which.

DETAILED DESCRIPTION OF EMBODIMENTS

Figure 1:
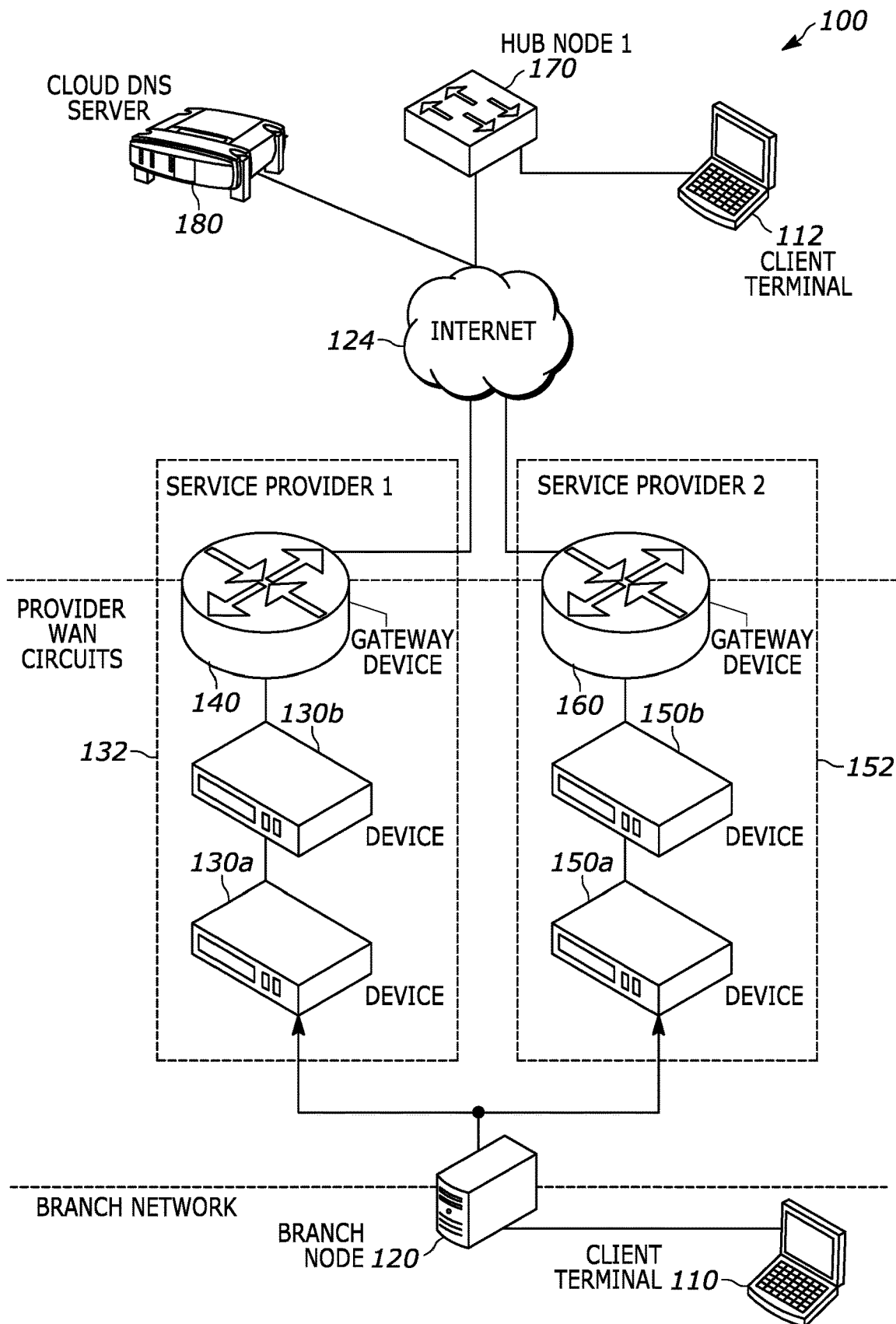
FIG. 1 is a schematic diagram illustrating an example topology used to illustrate the methods disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose methods for conditioning traffic using one or more paths for routing application traffic based on path performance metrics for hosted applications. The paths may include the Internet, an intranet, a private LAN, or through a cloud, such as a public cloud, a private cloud, and/or a hybrid cloud. Further, embodiments herein are described in the context of a Software Defined Wide Area Network (SD-WAN) where the paths are between hub nodes, branch nodes, or spokes or a hybrid path between different types of nodes. However, one skilled in the relevant art will recognize, in light of the description herein, that embodiments disclosed herein can be applied in non-software-defined WANs and for applications hosted within the network, e.g., within a LAN.

In cases of packet loss on a data path, packet replication and forward error correction (FEC) may be used to compensate for the packet loss. However, these techniques increase the total traffic on a link, which may cause even more packet loss. Lost packets at the receiving node may be recovered using Forward Error Correction. FEC may be used alone or together with packet replication and other techniques for sites that are experiencing a loss of clarity in VoIP calls or for any other time critical traffic which is experiencing packet loss on a path.

Packet replication may be used to minimize packet loss and reduce network latency. When there are two or more paths, packet replication may be implemented by sending copies of a packet on alternate available paths to reach the next hop, branch, or hub. The duplicate packets are used to replace packets that are lost or damaged. Any unneeded duplication is discarded at the receiving node and the original order of the packets may be preserved while forwarding packets to the end host.

Packet striping provides link or bandwidth aggregation at sites for which the throughput of multiple links may be used for one flow. To provide the combined throughput, the sending node sends successive packets on alternate available paths to reach the next hop branch, such as a hub. The original order of the packets is preserved while forwarding packets to the end host. Packet striping is particularly suitable for sites which have low-capacity links and require high throughput for specific types of traffic.

FIG. 1 is a schematic diagram illustrating an example topology used to illustrate the methods disclosed herein. The example topology shows a branch network with a plurality of devices such as a client terminal 110 having access to the Internet 124 through a branch node 120 using two links through different service providers (Service Provider 1 132 and Service Provider 2 152) via their respective WAN circuits. In the example topology, the WAN circuits can be part of an overlay network that includes one or more hub nodes Hub Node 170. Also shown in FIG. 1 is a cloud Domain Name Server (DNS) server 180 for serving DNS requests.

A hub node 170 is coupled to one or more client terminals such as the client terminal 112. This allows the two client terminals 110, 112 to communicate with each other and to connect to remote applications through one or both of the two paths provided by Service Provider 1 132 and Service Provider 2 152. While a branch node 120 is shown as a first site and a hub node 170 is shown as a second site, other configurations may be used to connect to the client terminals 110, 112. The first and second sites may correspond to any SD-WAN or similar type of device, e.g., a branch, hub or spoke. The traffic conditioning described herein featuring FEC, Packet Replication and Packet Striping, among others, operates between the two SD-WAN sites or similar types of devices. Any one or more of the connections, links, or paths may be fully or partially wired or wireless.

Each of the WAN circuits can have a plurality of routing devices. For example, the network of Service Provider 1 has a plurality of devices 130a, 130b performing networking functions and at least one gateway routing device 140. Similarly, the network of Service Provider 2 has a plurality of devices 150a, 150b performing networking functions and at least one gateway routing device 160. The two paths or links through different service providers 132, 152 represent possible available routes, e.g., SD-WAN paths between the first and the second sites. The two paths may be embodied as complementary paths with reachability between the two so that there are effectively four paths available between the first site and the second site. Alternatively, the two paths may have no interconnectivity between the two circuits, e.g., when one path is Broadband and the other path is MPLS (Multi-Protocol Label Switching). While the two paths are labeled as Service Provider 1 and Service Provider 2, the nature of any commercial connection between the two paths is not important to the operations and structures described herein.

As illustrated in FIG. 1, branches can be configured using single or multiple broadband circuits 132, 152 connected directly to the branch nodes 120, hub nodes 170, and spokes. In such scenarios, there may be various candidates for the best path to any particular application including but not limited to a direct connection from the branch, or through another node deployed as a cloud interconnection hub. Such hubs may be deployed in a variety of locations, for example, a third-party data center, an Internet interconnection, a hosting facility, or the data center of an application provider.

The available paths can be monitored to understand the performance metrics of data traffic through each path. The metrics can be used to determine a best path and to determine traffic conditioning techniques to be applied to the selected paths. A variety of different path parameters may be monitored including Mean Opinion Score (MOS), latency, packet loss, jitter, latency plus packet loss, SLA (Service Level Agreement) and/or monetary cost. For example, a score that takes into account latency and jitter could be: ALS (Application Link Score)=(latency+2*jitter).

Typically, for available paths between any two nodes in a network, the performance of the paths can be monitored using active or passive monitoring techniques. Active monitoring involves injecting test packets into the network environment through the various paths and measuring performance based on standard performance parameters. Passive monitoring involves monitoring network traffic data over a period of time to understand the performance of different paths. A metric is derived based on the performance and is compared for different available paths to choose the best path.

Active monitoring can increase the load on network infrastructure and is not ideal in all circumstances. Passive monitoring can involve collecting large volumes of data and may be limited by the fact that monitoring can only happen on the part of the network that is visible to the node monitoring the traffic. Further, as networks become more dynamic in nature, the monitoring mechanism that is more suitable can change based on changing conditions in the network. Furthermore, as networks become more complex and dynamic, the mechanisms for traffic monitoring and conditioning must be adaptable to changing conditions in the network as well. For example, in enterprise-wide WAN networks, particularly those that are software defined (e.g., Software-Defined Wide Area Network (SD-WAN)), the configuration of the network can change from time to time depending on the network policies. The monitoring and path selection criteria must adapt to changes accordingly. Still further, the mechanisms for performance-based path selection should be applicable to applications hosted outside of the network. For example, in an SD-WAN network, path selection mechanisms should apply to Internet-hosted applications, sometimes referred to as Software as a Service (SaaS) applications.

Figure 2:
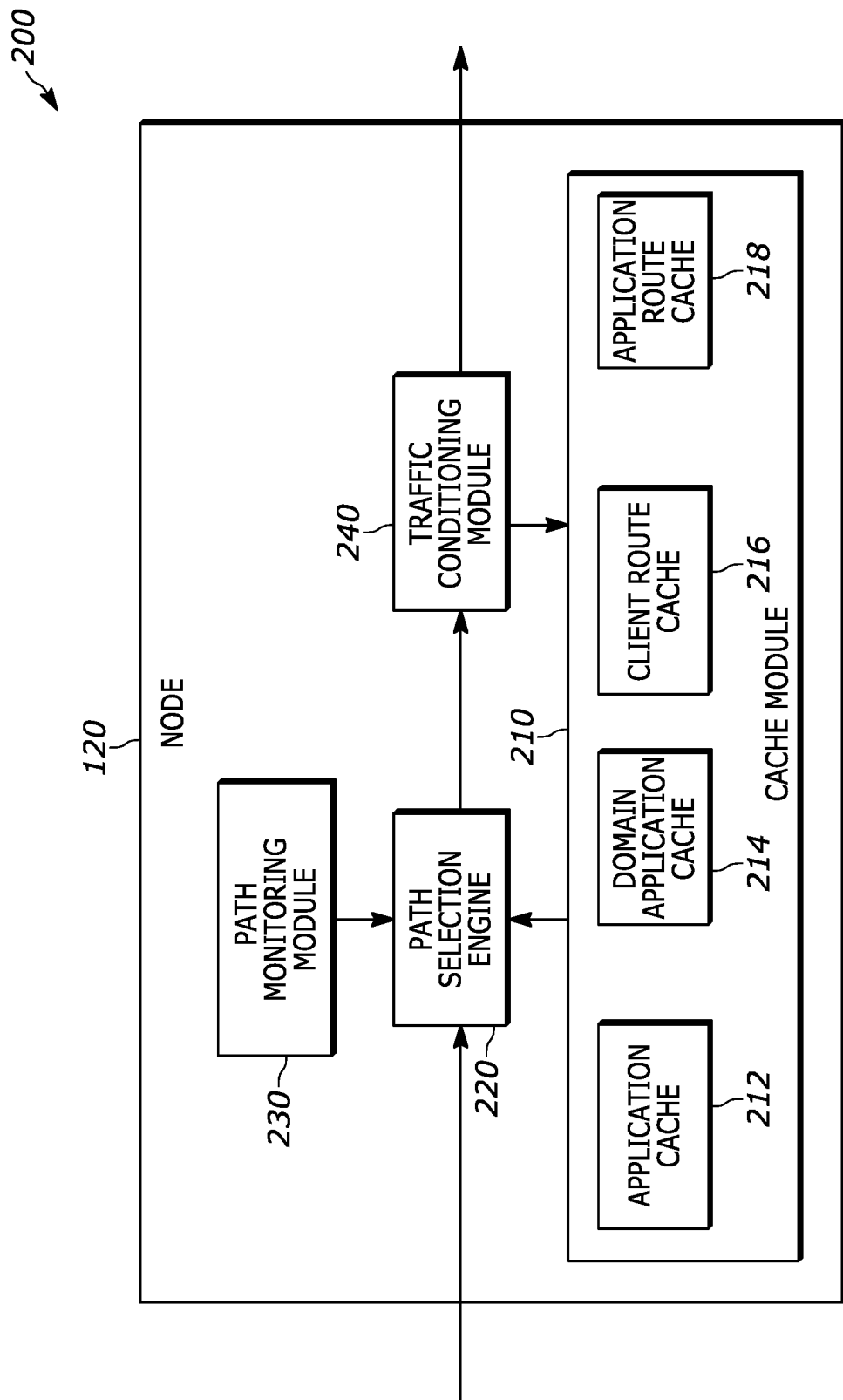
FIG. 2 is a block diagram of a branch or hub node, according to embodiments herein.

FIG. 2 is a block diagram of a node 120, which may be a branch node or a hub node, or another network node according to embodiments herein. The node 120 includes a cache module 210 with various caches (e.g., application cache (AC) 212, domain application cache (DAC) 214, client route cache (CRC) 216, and application route cache (ARC) 218) to store mapping information, a path selection engine 220 for performing path selection for DNS and data session traffic, a path monitoring module 230 between nodes (e.g., hub-hub, hub-branch, or branch-branch nodes), and a traffic conditioning module 240 for conditioning traffic to be sent on the selected path or paths. The functionality of each of the modules will be described in the context of the methods described herein. Additionally, each of the modules may be implemented through computer-readable instructions that are executed on a physical processor of a computing system that supports the node.

In an embodiment, the ARC 218 stores a near term history of all known paths for a given application along with the associated performance metrics and a score e.g., packet loss, link utilization, delay, MOS (Mean Opinion Score), SLA (Service Level Agreement), and ALS, among others. The ARC information can be used to select the best path for an application. In an embodiment, the best path is a path that has the lowest latency, the lowest packet loss, and/or the lowest economic cost, or a combination thereof. In an embodiment, entries are added to the ARC as and when performance metrics are learned for an application session on a particular path. The server prefix for an application may be 0 or a specific prefix. The ARC can be used to maintain scores for applications or services, as well as for an application on a per-server basis (as the application may be served by many different IP addresses).

The AC 212 is a cache used to store a mapping between (routing instance, destination IP, destination port) tuple to an application or service. In an embodiment, an application cache entry is created when the application is identified for a given session. An AC entry may be associated with more than one application or service. In an embodiment, the AC is used to identify the application or service for a session on the first packet, so that application specific rules (for example, based on SD-WAN policy) can be looked up without relying on deep packet inspection (DPI)-based application identification, which happens later in the life of the session.

The DAC 214 is a cache used to store a mapping between a DNS name and an application or service. A DAC entry is created when an application is detected in a data session (for example, HTTP or HTTPS session). In an example session involving an HTTP session, the domain name is obtained from the HTTP host header, and for an HTTPS session, the domain name is obtained from the Server Name Indication (SNI) field in the Secure Socket Layer (SSL) client hello field.

The CRC 216 is a cache which is used to store a mapping between the (routing instance, source IP address, destination IP address) tuple and a path, (either a WAN circuit or an indirect path via a hub node). The CRC can be used to maintain path affinity for sessions initiated by a client to a specific server.

The path monitoring module 230 obtains performance data for the various eligible paths through passive or active monitoring or a combination. Performance data may also be obtained from other nodes. Passive monitoring, in an example embodiment, involves collecting various transport layer (Layer 4 of the Open System Interconnect (OSI) model) as well as application layer (Layer 7 of the OSI model) metrics for Transmission Control Protocol (TCP) based application sessions transiting the node and/or appliance. The metrics can include, for example, at least network and server response times and packet loss estimates in each direction. Passive monitoring can happen at both branch and hub nodes.

In other embodiments of passive monitoring, path selection can be based on performance metrics such as the Mean Opinion Score (MOS), for example, for voice traffic. For UDP (User Datagram Protocol)-based applications, various metrics, in combination with MOS or otherwise, can be used for path selection including but not limited to transaction times for UDP based protocols, a pre-defined metric such as apdex score (e.g., Application Performance Index, which is an open standard for measuring user satisfaction with response time of web applications), application specific metrics such as DNS response time (for DNS traffic), and user-defined metrics.

In an embodiment, active monitoring involves using active monitoring probes to measure responsiveness of applications. The active monitoring probes can be based on but not limited to ICMP (Internet Control Message Protocol), TCP (Transmission Control Protocol) or HTTP (Hyper Text Transfer Protocol)-based. For example, HTTP requests can be placed on the server of an application to understand the response performance of the application on a specific path. The active monitoring can be done at pre-configured intervals. Further, in various embodiments, the interval is dynamically configurable (for example, through a command line interface or a web interface on the node).

In a preferred embodiment, hub nodes perform both active monitoring and passive monitoring of application traffic, and branch nodes perform passive monitoring of application traffic. Further, branch and hub nodes may perform active monitoring of the network between them using any suitable means, shown in the embodiment of FIG. 2 as a path monitoring module 230. In an embodiment, hub nodes export active monitoring data to various branch nodes using one or more existing protocols for exchanging information between nodes (for example BGP (border gateway protocol). Branch nodes can combine the active monitoring data from hub nodes, active monitoring data between the branch and hub, and the passive monitoring data available locally to determine overall performance of an application through a particular path.

In various embodiments, the score configuration can be dynamic. The combination of metrics to be used in determining a score may be derived based on statistical analysis of the performance over a period of time. Determination of appropriate metrics including their relative weights can happen at pre-configured intervals or based on certain events indicating changes in the network topology/configuration. In an embodiment, the MOS score is determined as a function of packet latency, packet loss, and jitter.

Figure 3:
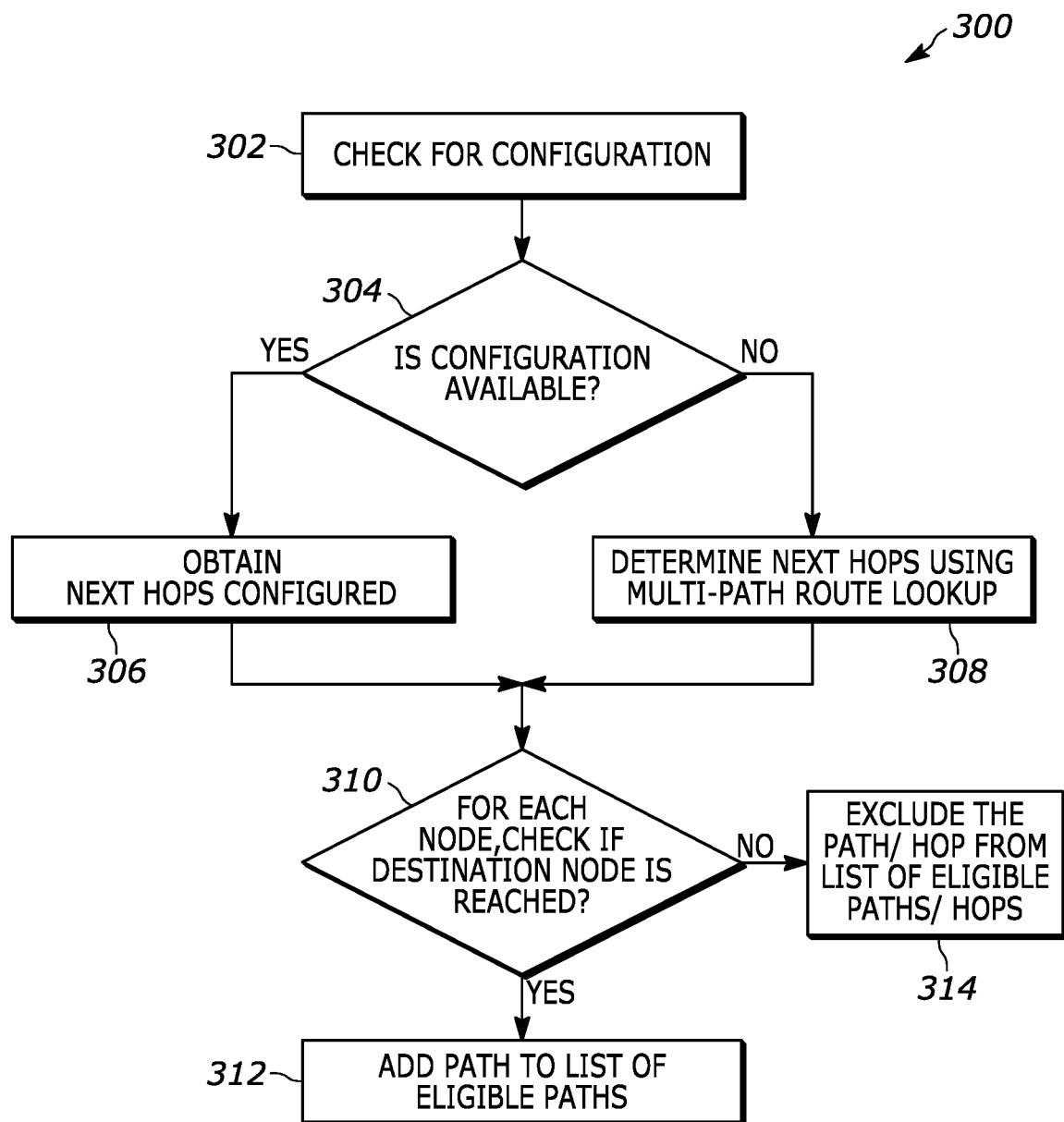
FIG. 3 is a flow diagram illustrating an example of a method for identifying eligible paths from a given node to a node hosting an application of interest, according to embodiments herein.

FIG. 3 is a flow diagram illustrating an example of a method for identifying eligible paths from a given node to a node providing communications or hosting an application or service of interest. Typically, when data traffic is identified, a node (e.g., an originating node) can look for a configuration to check if next hop nodes are configured (step 302). For example, a configuration may be implemented as an SD-WAN forwarding profile that includes indications of next hop priorities. If such a configuration is available (decision point 304), the configured next hop nodes are obtained from the configuration (step 306). For each of the next hop nodes, further next hop nodes are obtained until the destination node is reached (decision point 310).

Once the destination node is reached, the path traced through the various nodes is added to a list of eligible paths (step 312). Returning back to decision point 304, if the next hops configuration is not found on a node, then a multi-path route look procedure can be used (step 308) to determine the next hops for the node (also referred to as route-based path) and the process proceeds to decision point 310. If a destination node is not reached, the path/hop is excluded from the list of eligible paths/hops (step 314).

In various embodiments, where there is path brownout (e.g., a temporary total loss of service), a next hop can be taken out of the rotation. For example, taking a path out of the rotation may involve excluding a path from consideration in a round-robin load balancing selection algorithm.

Local breakout paths (e.g., paths that can access an application, service, or node directly over the Internet without passing through a hub node of the SD-WAN) can be used in either routing mode or as explicitly configured next hops. For example, for a route-based path, an ICMP (Internet Control Message Protocol) monitor can be attached to a path, and the route advertised via that path can be withdrawn from a list of eligible paths when the monitor goes down. Similarly, an explicitly configured next hop can be taken out of the rotation (e.g., taken out of a list of eligible paths) when a monitor attached to it goes down. When a path is taken out of the rotation, any path affinity to that path, e.g., established via a CRC entry, also becomes invalid and is not honored. New sessions which would have used the stale path now go through a fresh path selection decision instead.

A path via a hub node can be taken out of the rotation (e.g., taken out of a list of eligible paths) when all paths to the hub node are declared as down by site-to-site SLA monitoring. For example, with regard to FIG. 1, if all paths from branch node 120 to hub node 170 are down, then all paths that traverse the hub node 170 can be taken out of the rotation. The identified eligible paths are stored in the cache module 210 as described above.

Figure 4:
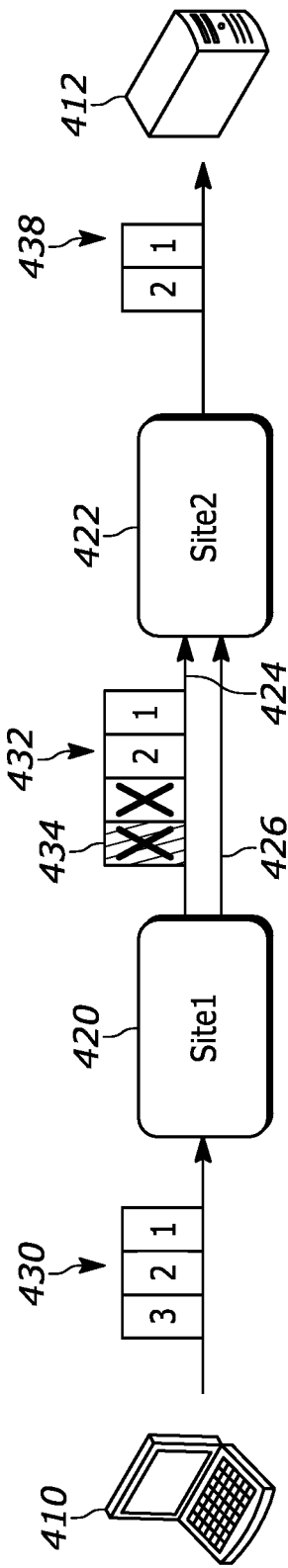
FIG. 4 is a diagram of traffic conditioning between a first site and a second site using an FEC packet, according to embodiments herein.

FIG. 4 is a diagram of an example of traffic conditioning as may be applied by the traffic conditioning module 240 to data that is sent from a first terminal 410, such as an end user terminal, as shown, to a second terminal 412, such as a server, as shown. The type of terminal and the type of data may be adapted to suit any particular use for applications, services, voice, or any other use. The first terminal sends a packet stream 430 to a first site 420, e.g., a branch node, hub node, or any other suitable node. The first site is coupled to a second site 422 through two different paths 424, 426 as described above. The second site 422 receives a data packet sequence 432 from the first site 420 and forwards these as a packet stream 438 to the second terminal 412 for consumption or processing. This diagram and those like it are a simplification to represent different types of traffic conditioning. In an actual implementation there may be more or fewer paths, nodes, and packets than shown in these simplified diagrams. There may be additional components and additional processing that is not shown in order not to obscure the traffic conditioning examples.

In the example of FIG. 4, the first site has selected the first path 424 to send three packets of the packet stream 430 from the first terminal. The first site sends the three packets as a data packet sequence 432 with an FEC packet 434 that may be used to correct any errors and regenerate any one of the three packets if a packet is lost or corrupted on the first path 424. In this example, the third data packet of the data packet sequence 432 and the FEC packet 434 are lost while the first two packets of the packet stream are successfully received. Accordingly, the second site 422 provides the first two packets of the packet stream 430 to the second terminal 412.

The FEC packet 434 is generated by the first site 420 in response to traffic and path conditions on the first and second paths 424, 426. In the FEC mechanism of FIG. 4, the first site 420 is the sender and sends the packets and generates an FEC packet every three packets. When a flow which matches the policy is received at the first site, it will start generating FEC packets. The second site 422 keeps track of the sequence numbers of the packets in the data packet sequence 432 so that it can identify lost packets. In some embodiments, each packet has a header with a sequence number and an indication as to whether an FEC has been sent. If no packets are lost, the second site 422 will consume the FEC packet. However, if the second site 422 detects a loss, then when the FEC packet 434 arrives in the second site 422, the second site 422 will use this information to regenerate the lost packet. The first site 420 attaches a header to the FEC packet that indicates that the packet contains FEC and indicates the selected number of packets to which it pertains, in this example three data packets.

Any suitable FEC code may be used and with varying complexity, e.g., Hamming codes, BCC (Binary Convolution Codes), LDPC (Low-Density Parity Check) code, Reed-Solomon codes, etc. In some embodiments, the FEC code is an XOR (Exclusive OR) parity code generated so that it corresponds to some selected number (P) of packets. At the receiving branch the FEC packet is used to recover any lost packets in the group of P packets. For FEC based on parity, this parameter is the frequency of the generation of parity packets, referred to as the number-of-packets per parity (P). A lower value gives better protection but results in higher overhead. For example, if a parity packet is generated for every 3 packets (P=3) then the overhead is 100/3=33%. If there is a uniform loss of 5% in that path, the probability that all 3 packets make it across the network is 98.6 (85.74 without FEC). When the number-of-packets per parity is changed to 6, then the overhead reduces to 100/6=16%. Now the probability of all 6 packets making it across the network will be 95.56%. The first site 420 may include a mechanism to choose between improving the protection at the cost of extra bandwidth, depending on the level of protection desired and the available bandwidth on the paths between the two sites. Only the sender needs to be configured with the number-of-packets per parity parameter. The parity packet has enough information for the receiver to determine the parameter on the sender side.

In some FEC codecs, more critical information is present in the initial part of the data packet payload. For such a codec, it is more important to be able to recover the initial part of the payload. The FEC packet generation may be directed only at the initial part of the data packet payload, reducing the overhead used on the path for carrying parity packets. This may also be a part of the mechanism at the first site or all of these parameters may be pre-configured by an administrator. In some embodiments, the first site 420 monitors the paths 424, 426 available to connect to the second site 422 and if a quality score, such as packet loss, is less than a quality threshold, then the first site 420 generates the FEC packet 434 and sends the FEC packet 434 with the data packet sequence 432.

Figure 5:
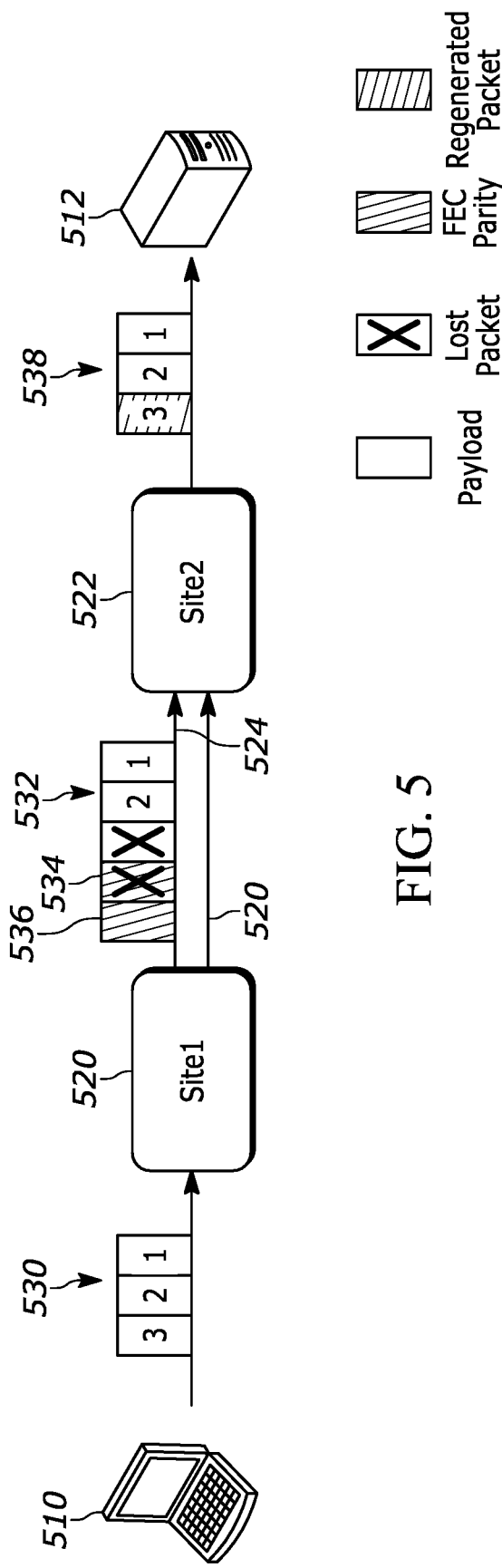
FIG. 5 is a diagram of traffic conditioning between a first site and a second site using a replicated FEC packet according to embodiments herein.

FIG. 5 is a diagram of another example of traffic conditioning as may be applied by the traffic conditioning module 240 to data that is sent from a first terminal 510 to a second terminal 512. The first terminal sends a packet stream 530 to a first site 520. The first site is coupled to a second site 522 through two different paths 524, 526 as described above. The second site 522 receives a data packet sequence 532 from the first site 520 and forwards these as a packet stream 538 to the second terminal 512 for consumption or processing. The first site 520 has selected the first path 524 to send three packets of the packet stream 530 from the first terminal. The first site sends the three packets of the data packet sequence 532 with an FEC packet 534.

In this example, the first site replicates the FEC packet and sends a first FEC packet 534 and a replication 536 of the first FEC packet with the data packet sequence 532. In this example, even though the third data packet of the data packet sequence 532 and the first FEC packet 534 are lost, the replication 536 FEC packet is successfully received so that the second site 522 is able to regenerate the third data packet of the data packet sequence 532 using the replicated FEC packet. Accordingly, the second site 522 provides the complete packet stream 538 to the second terminal 512. In some embodiments, the first site 520 monitors the paths 524, 526 available to connect to the second site 522 and if a quality score, such as packet loss, is less than a quality threshold and the utilization of the first path 524 is less than a high utilization threshold for the link, then the first site 520 generates the FEC packet 534 and the replication 536 of the FEC packet and sends both FEC packets 534, 536 with the data packet sequence 532. The first site may also consider the utilization of the second path 526 to determine whether to send one or more FEC packets on the second link as described below.

Figure 6:
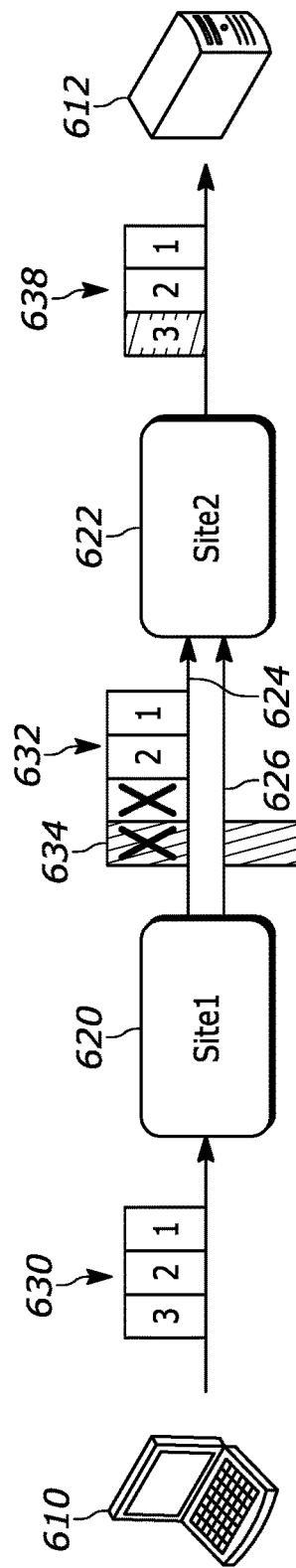
FIG. 6 is a diagram of traffic conditioning between a first site and a second site using a replicated FEC packet on an alternate path, according to embodiments herein.

FIG. 6 is a diagram of another example of traffic conditioning as may be applied by the traffic conditioning module 240 to data that is sent from a first terminal 610 to a second terminal 612. The first terminal sends a packet stream 630 to a first site 620. The first site is coupled to a second site 622 through two different paths 624, 626 as described above. The second site 622 receives a data packet sequence 632 from the first site 620 and forwards these as a packet stream 638 to the second terminal 612 for consumption or processing.

The first site 620 has selected the first path 624 to send three packets of the packet stream 630 from the first terminal as a data packet sequence 632 with an FEC packet 634. A replication 636 of the FEC packet 634 is sent on the second path 626. At the second site 622, although the third packet of the data packet sequence 632 and the FEC packet 634 on the first path 624 are lost or corrupted, the FEC packet replication 636 on the second path 626 is received. The second site 622 is able to regenerate the packet stream 630 from the first client to provide a full set of the received packets as the packet sequence 638 to the second client. In some embodiments, the first site 620 replicates the FEC packet on the second path 626 when the packet loss on the first path is greater than a threshold and the second path utilization is less than a high utilization threshold.

Figure 7:
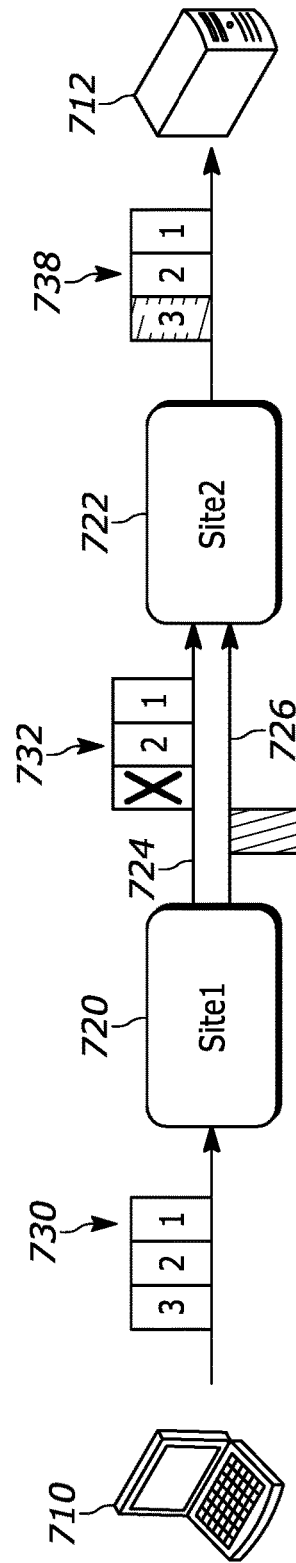
FIG. 7 is a diagram of traffic conditioning between a first site and a second site using an FEC packet on an alternate path, according to embodiments herein.

FIG. 7 is a diagram of another example of traffic conditioning as may be applied by the traffic conditioning module 240 to data that is sent from a first terminal 710 to a second terminal 712. The first terminal sends a packet stream 730 to a first site 720. The first site is coupled to a second site 722 through two different paths 724, 726 as described above. The second site 722 receives a data packet sequence 732 from the first site 720 and forwards these as a packet stream 738 to the second terminal 712 for consumption or processing.

The first site 720 has sent the data packet sequence 732 on the first path 724. An FEC packet 734 for the data packet sequence 732 has been sent on the second data path 726. The second site 722 uses the FEC packet 734 to regenerate the third packet of the data packet sequence 732. The first site 720 may choose to send the FEC packet 734 on the second path when the utilization or path loss on the first path is high but utilization is low on the second path. The first site 720 is not adding any overhead on the first path on which the data is flowing. In this way, the full bandwidth available on the first path is available for the data flow.

Figure 8:
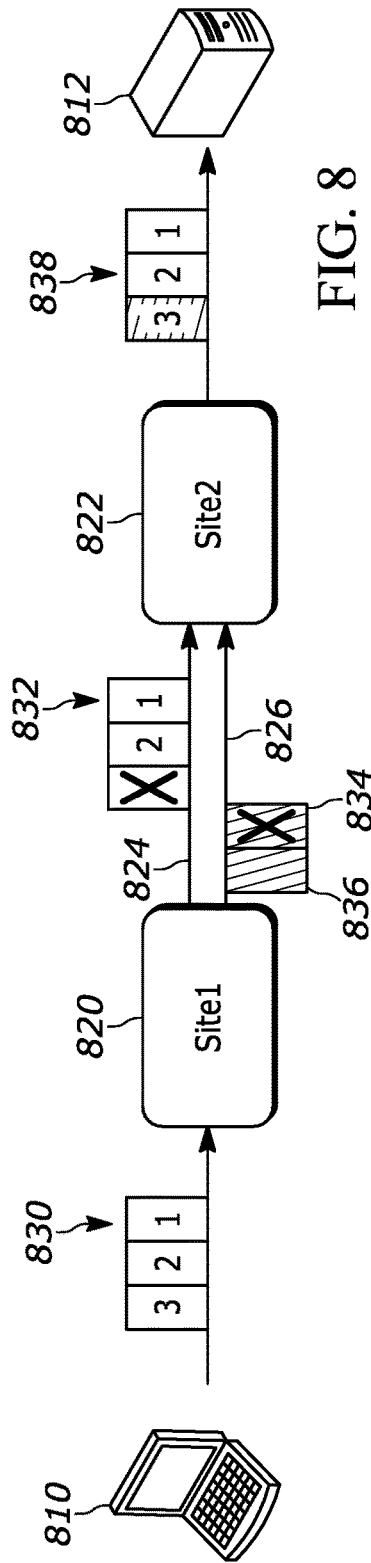
FIG. 8 is a diagram of traffic conditioning between a first site and a second site using an FEC packet and a replicated FEC packet on an alternate path, according to embodiments herein.

FIG. 8 is a diagram of another example of traffic conditioning as may be applied by the traffic conditioning module 240 to data that is sent from a first terminal 810 to a second terminal 812. The first terminal sends a packet stream 830 to a first site 820. The first site is coupled to a second site 822 through two different paths 824, 826 as described above. The second site 822 receives a data packet sequence 832 from the first site 820 and forwards these as a packet stream 838 to the second terminal 812 for consumption or processing. An FEC packet 834 and a replication of the FEC packet 836 may be sent on the second data path 826.

Even if the FEC packet 834 is lost, the replication 836 of the FEC packet is received and the second site 822 uses the replication 836 FEC packet to regenerate the lost third packet of the data packet sequence 832. The first site 820 is not adding any overhead on the first path on which the data is flowing. In this way, the full bandwidth available on the first path is available for the data flow. Variations, replications, and extensions of the FEC packet may be sent on the second data path without adding to the traffic on the first data path.

Figure 9:
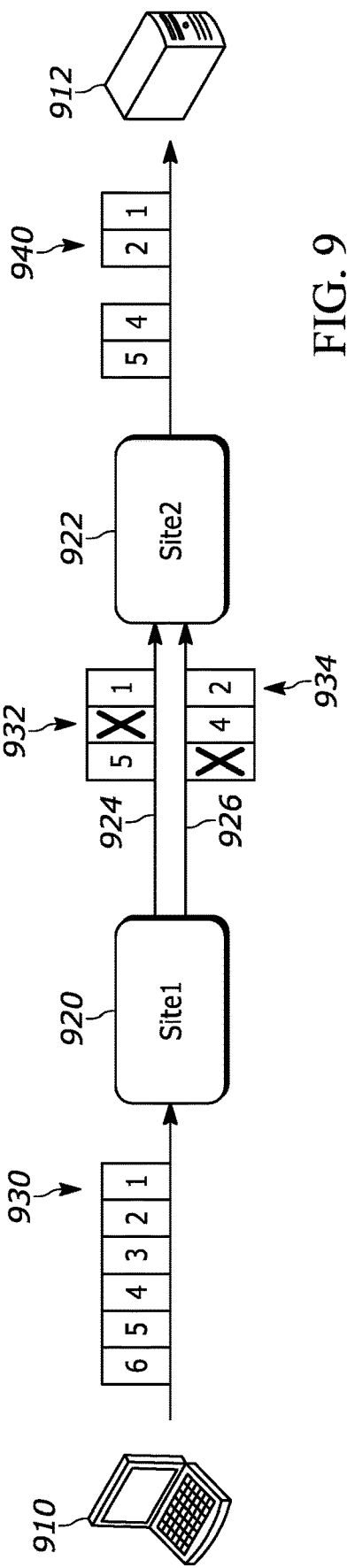
FIG. 9 is a diagram of traffic conditioning between a first site and a second site using packet striping on multiple paths, according to embodiments herein.

FIG. 9 is a diagram of another example of traffic conditioning as may be applied by the traffic conditioning module 240 to data that is sent from a first terminal 910 to a second terminal 912. In this example of data or packet striping, two paths are being used to provide aggregated bandwidth to the data flow. However, without FEC or replication, lost or corrupted packets cannot be recovered. The first terminal sends a packet stream 930 to a first site 920. The first site is coupled to a second site 922 through two different paths 924, 926 as described above. The second site 922 receives the packets and forwards these as a packet stream 940 to the second terminal 912 for consumption or processing. For packet striping, the first site 920 sends a first data packet sequence 932 on the first path 924 and a second data packet sequence 934 on the second path 926 to the second site 922. In this example, packets 3 and 6 are lost or corrupted between the first site 920 and the second site 922 and cannot be recovered to be included in the packets of the packet stream 940 that is sent to the second terminal. This type of packet loss can be compensated as described below.

In FIG. 9, packet striping is performed by alternating the received packets of the packet stream 930 on the two paths 924, 926. In this example, packets 1, 3, and 5 are sent in the first data packet sequence 932 on the first path and packets 2, 4, and 6 are sent in the second data packet sequence 934 on the second path. This simplistic approach may be improved by considering the available bandwidth of each path. Each path may have an assigned or provisioned traffic bandwidth based on physical or contract limitations. Each path also has an amount of utilization. One path may be utilized close to its capacity while another path is not significantly utilized. When there is no activity and the traffic bandwidth of each of the two paths is, for example, 10 Mbps, then an even distribution of packets, e.g., alternating or round robin distribution makes the best use of all of the available bandwidth on each path. Reducing traffic on each path tends to reduce packet loss.

As the link utilization increases on each path, the available bandwidth is reduced. If, for example, the traffic or traffic rate is 5 Mbps, then the remaining available bandwidth from the total capacity of 10 Mbps is 5 Mbps. In the beginning when both paths have no utilization and 10 Mbps capacity for new flows, weights of, e.g., 10 each, may be assigned to each path. After the first path is utilized at 5 Mbps and therefore left with a 5 Mbps bandwidth of the assigned capacity, then the weights change to 5 and 10 for the two paths respectively. Packet striping may be based on applying these weights so that 5 packets are sent on the first path for every 10 packets on the second path. Alternatively, 1 packet is sent on the first path for every 2 packets on the second path. With the initial conditions and the weights at 10 and 10, the same number of packets are sent on each path as shown in FIG. 9. Such a distribution may be obtained using a variety of different techniques including a weighted round robin.

Another approach is to treat the weights 10 and 5 as a bandwidth index, link utilization, score, or rating. The link utilization on each path, i.e., the capacity minus the traffic rate, is rendered as a number, e.g., 10 and 5. The two or more numbers, depending on the number of available paths, are used as an allocation ratio to allocate packets between the two paths. The initial ratio is 10:10 or 1:1. Later the allocation ratio is adjusted based on the new traffic conditions to 10:5 or 2:1.

FIG. 9 is a diagram of another example of traffic conditioning as may be applied by the traffic conditioning module 240 to data that is sent from a first terminal 1010 to a second terminal 1012. In this example, data or packet striping is used with FEC for each path and lost or corrupted packets are recovered. The first terminal sends a packet stream 1030 to a first site 1020. The first site is coupled to a second site 1022 through two different paths 1024, 1026 as described above. The second site 1022 receives the packets and forwards these as a packet stream 1040 to the second terminal 1012 for consumption or processing. For packet striping, the first site 1020 sends a first data packet sequence 1032 and an FEC packet 1036 for the first data packet sequence 1032 on the first path 1024 and a second data packet sequence 1034 and an FEC packet 1038 for the second data packet sequence 1034 on the second path 1026 to the second site 1022. In this example, packets 3 and 6 are lost or corrupted and are recovered using the respective FEC packets 1036, 1038. The complete set of packets of the packet stream 1040 are sent to the second terminal 1012.

In an alternative embodiment, there may be one FEC packet for the first six data packets, so that the first FEC packet 1036 provides error correction for the first 1032 and the second data packet sequence 1034. The second FEC packet is then a replication 1038 of the first FEC packet. As a further alternative, if the packet loss is primarily on one data path, then FEC packets may be sent only for packets on that path. As an example, if only the first data path is experiencing noticeable packet loss, then the second FEC packet 1038 for the second data packet sequence 1034 can be avoided and neither generated nor sent.

Figure 11:
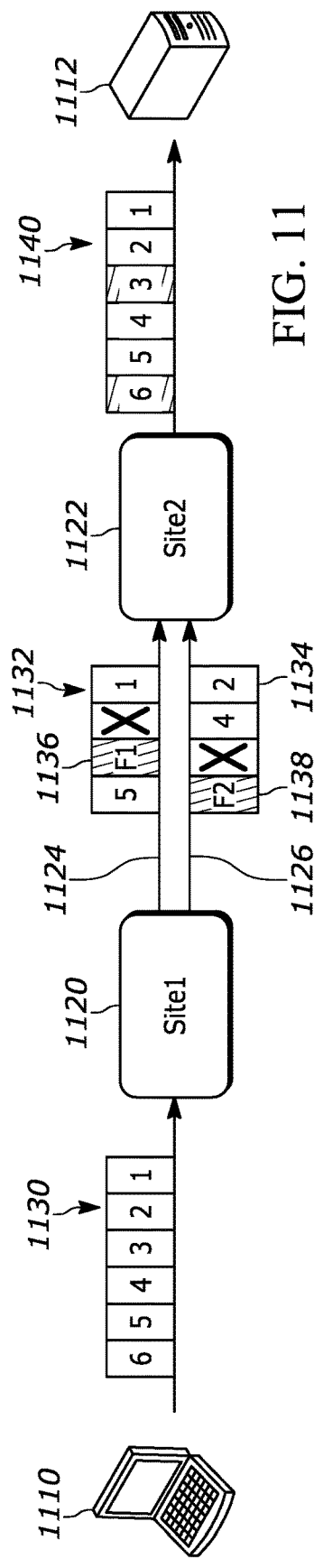
FIG. 11 is a diagram of traffic conditioning between a first site and a second site using packet striping and FEC packets with reordering, according to embodiments herein.

FIG. 11 is a diagram of another example of traffic conditioning as may be applied by the traffic conditioning module 240 to data that is sent from a first terminal 1110 to a second terminal 1112. In this example, data or packet striping is used again with a separate FEC for each path and lost or corrupted packets are recovered. The first terminal sends a packet stream 1130 to a first site 1120. The first site is coupled to a second site 1122 through two different paths 1124, 1126 as described above. The second site 1122 receives the packets and forwards these as a packet stream 1140 to the second terminal 1112 for consumption or processing. For packet striping, the first site 1120 sends a first data packet sequence 1132 with packets 1, 3, 5 on the first path 1124 and a second data packet sequence 1134 with packets 2, 4, 6 on the second path 1126 to the second site 1122. A first FEC packet 1136 is rendered for packets 1, 2, 3 and sent on the first data path 1124. A second FEC packet 1138 is rendered for packets 4, 5, 6 and sent on the second data path 1126. This approach may be useful when the traffic conditioning module 240 finds packet loss on both data paths 1124, 1126. In this example, packets 2 and 6 are lost or corrupted and are recovered using the respective FEC packets 1136, 1138. The complete set of packets of the packet stream 1140 are sent to the second terminal 1112.

Figure 10:
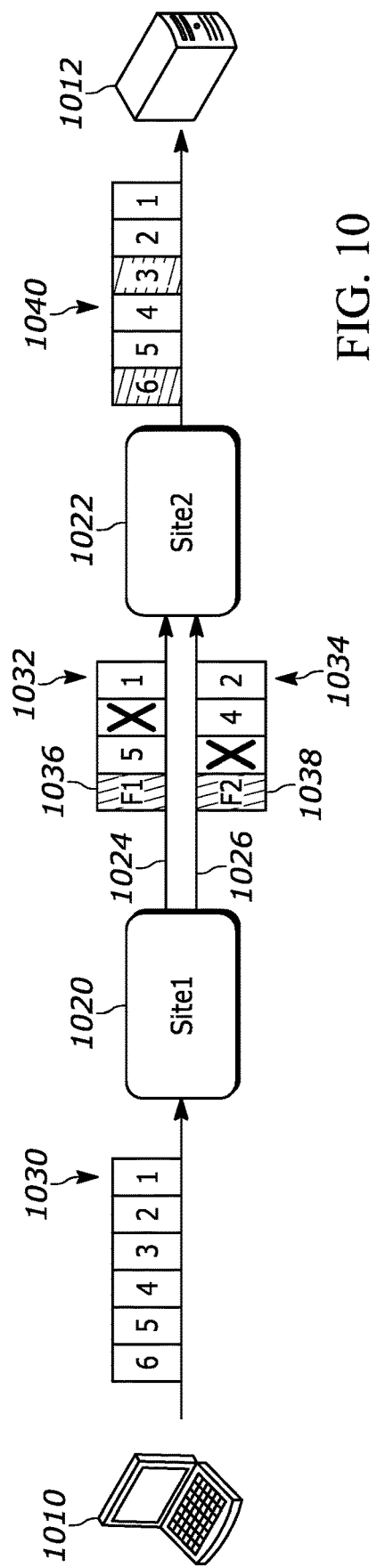
FIG. 10 is a diagram of traffic conditioning between a first site and a second site using packet striping and FEC packets, according to embodiments herein.

As a further alternative, the FEC packet 1136 may be configured for packets 1, 3, 5 of the first data packet sequence 1132 and be reordered with respect to the first data packet sequence 1132 and is placed within the first data packet sequence, e.g., between packet 3 and 5 instead of after packet 5. The second FEC packet 1138 is configured for packets 2, 4, 6 of the second data packet sequence 1134 and is placed after the second data packet sequence 1134 as in FIG. 10. In some instances, reordering the FEC packets within the data packet sequence provides for a more robust transmission. Each packet is identified with a header and this allows any of the packets to be reordered with respect to other packets.

Figure 12:
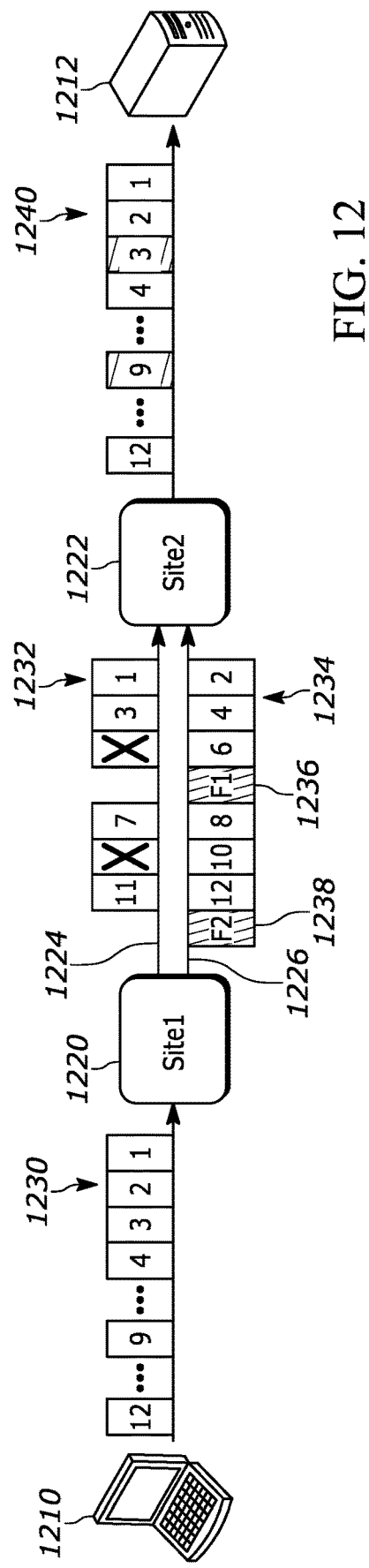
FIG. 12 is a diagram of traffic conditioning between a first site and a second site using packet striping, and FEC packets on only one path, according to embodiments herein.

As a further alternative, FIG. 12 is a diagram of traffic conditioning between a first terminal 1210 and a second terminal 1212 through a first site 1220 and a second site 1222 using two paths 1224, 1226. A packet stream 1230 from the first terminal has twelve packets as shown with more to follow. The packet stream is sent from the first site 1220 with packet striping so that odd numbered packets 1232 are sent on the first path 1224 and even-numbered packets 1234 are sent on the second path 1226. In this example packet loss on the second path 1226 is low and packet loss on the first path is higher 1224. As an example, packet loss on the second path is less than a quality threshold (N) while packet loss on the first path is greater than the quality threshold (N). As a result, the first data packet sequence 1232 is sent with FEC packets. In this case, there is a first FEC packet 1236 for the first three packets 1, 3, 5, and a second FEC packet 1238 for the next three packets 7, 10, 11. This may continue for many more packets. The FEC packets 1236, 1238 for the first data packet sequence 1232 are sent on the second path 1226 to reduce overhead on an already lossy first path 1224. The second data packet sequence 1234 does not use FEC packets, reducing overhead and utilization of the second path.

Figure 13:
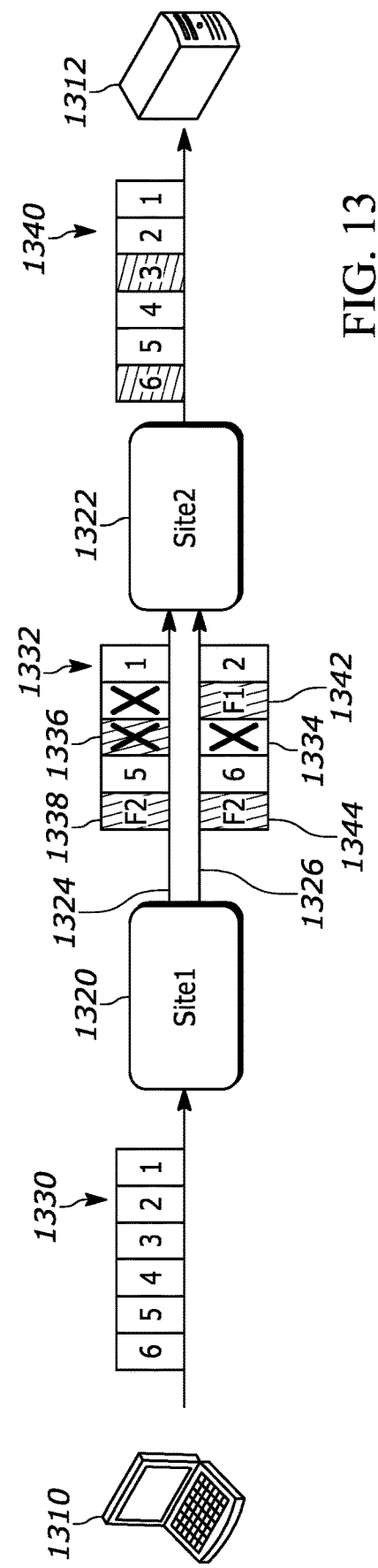
FIG. 13 is a diagram of traffic conditioning between a first site and a second site using packet striping, replicated FEC packets and reordering, according to embodiments herein.

FIG. 13 is a diagram of another example of traffic conditioning as may be applied by the traffic conditioning module 240 to data that is sent from a first terminal 1310 to a second terminal 1312. In this example, data or packet striping is used with replicated FEC packets for each path and lost or corrupted packets are recovered. The first terminal sends a packet stream 1330 to a first site 1320. The first site is coupled to a second site 1322 through two different paths 1324, 1326 as described above. The second site 1322 receives the packets and forwards these as a packet stream 1340 to the second terminal 1312 for consumption or processing.

For packet striping, the first site 1320 sends a first data packet sequence 1332, an FEC packet 1336 for the first data packet sequence 1332, and a replicated FEC packet 1338 for the second data packet sequence 1334 on the first path 1324. The first site 1320 sends a second data packet sequence 1334, an FEC packet 1344 for the second data packet sequence 1334, and a replicated FEC packet 1342 for the first data packet sequence 1332 on the second path 1326 to the second site 1322. In this example, packets 3 and 6 are lost or corrupted and are recovered using the respective FEC packets 1342, 1338. In this example the FEC packet 1336 for the first data packet sequence 1332 is also lost or corrupted but the replicated FEC packet on the second path is received and used for recovery. The complete set of packets including the regenerated packets are sent as the packet stream 1340 to the second terminal 1312. Packet reordering has also been applied so that the FEC packet 1336 for the first data packet sequence 1332 is placed within that data packet sequence on the first path 1324 and also the replication of the FEC packet 1342 is placed within the second data packet sequence 1334 on the second path 1326. Packet reordering has not been applied to the FEC packets 1338, 1344 for the second data packet sequence 1334. They are placed at the end of the sequence.

The example of FIG. 13 includes packet striping and reordering similar to that of FIG. 11. It also has the FEC packet sent on both the same path as the data packets and a different path from the data packets similar to FIG. 6. This shows an example that various levels of redundancy may be added to the traffic conditioning to suit different path quality metrics and different demands for accuracy and recoverability.

FEC recovery can cause packet reordering at the receiver or at the second site in the above examples. First, the sender may reorder the packets before they are sent. Alternatively, intermediate routers may reorder the packets as they are transmitted. Second, when a packet is lost or corrupted, the receiver may be required to wait for a replication of that packet or an FEC packet before it can reassemble the original packet stream. Consider, for example, the case where an FEC packet is generated every 4th packet, and the 2nd packet is lost. Since the 2nd packet can be regenerated only when the FEC packet is received, which happens after the 4th packet, the receiver will see packets in the following order: 1, 3, 4 and then 2. The receiver buffers the received packets until they can be sent out in order. The end host sees the packets in the correct sequence but with some delay.

Similarly, in packet replication and striping, as packets are arriving at the receiver on different bandwidth paths, the packets can arrive out of order. Delivering out-of-order packets to an end host can cause retransmissions as the end host assumes that an out-of-order packet means that a packet has been lost. A configuration option may be provided at the receiver that enables real-time packet reordering to provide a seamless experience to the end host.

Automatic path steering can be combined with packet replication and FEC to provide still more reliability for critical applications or for audio/video flows. In some embodiments, when more than one path is available, then FEC may be enabled by default and packet replication may be configured as enabled based on an SLA profile. An example SLA violation profile may be based on a packet loss threshold, e.g., a 5% loss on the path. When the data flows start experiencing a loss of less than 5% and the paths are still SLA compliant, then FEC is enabled. The receiving site recovers lost packets with FEC until the receiver reaches the threshold of 5% packet loss. At that point, the path may be marked as SLA violated and automatic path steering may be used to move the flow to a better available path with no or less packet loss. If the other path also becomes lossy then packet replication may be turned on to allow the receiver to recover from further packet losses. Hence a combination of these features can provide maximum possible performance at the same time not adding significant overhead on the paths.

Figure 14:
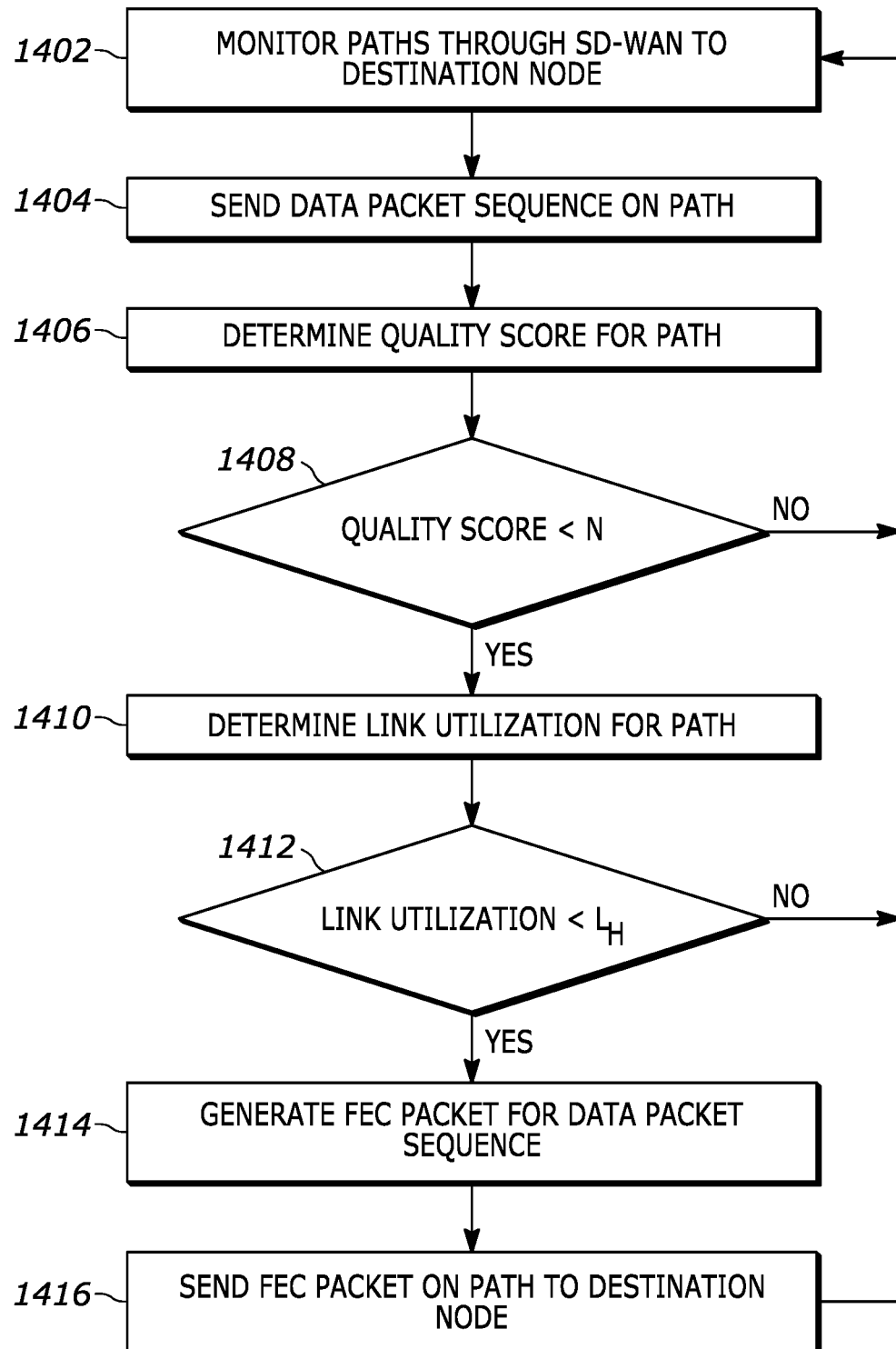
FIG. 14 is a process flow diagram illustrating an example of a method of traffic conditioning using FEC packets on a path, according to embodiments herein.

FIG. 14 is a process flow diagram to show traffic conditioning through a data link of an SD-WAN using FEC packets in response to changes in a quality score. The FEC packets may be exclusive OR parity packets, or any other type of FEC, e.g., Hamming, LDPC, Reed-Solomon, etc. At 1402 one or more paths through an SD-WAN between a source node such as the client terminal 110 of FIG. 1 and a destination node, such as the client terminal 112 of FIG. 1 are monitored. One or more of the paths are selected for use in sending data from the source to the destination. At 1404 a data sequence is prepared to send on the selected path.

At 1406, the monitoring process determines a quality score for the selected path. The quality score may be a packet loss score, an SLA score, an MOS, or any of a variety of different quality measures. At 1408, the quality score is compared to a standard such as a packet loss threshold. If the quality of the path is high, e.g., the packet loss is less than a path threshold, then link utilization is determined for the path at 1410. The link utilization may be determined in a variety of different ways. One example is to average the traffic over a set period of time, such as a few seconds, and then subtract the traffic rate from the stated traffic bandwidth of the path. The current link utilization may be compared to a high threshold $L_H$ and if the link utilization is less than the threshold at 1412, then an FEC packet is generated at 1414 and sent with the data packet sequence to the destination node at 1416. When the link utilization is greater than the high threshold, then, in order to preserve bandwidth for data packets and reduce the overhead, the FEC packet is not sent. Similarly, if the quality score is high, then no FEC packet is needed and bandwidth is also preserved for data packets.

The process flow also includes that when the quality score improves, e.g., if packet loss is very low, then the FEC packets may be stopped. The process may also respond to changes in the quality score by changing the number-of-packets per parity (P). In one example, the system is initialized with a particular value for P which may be set by an administrator or based on the available paths, the type of traffic, or the desired overhead. The process monitors the quality and when the quality is improved, then P may be increased for fewer FEC packets in the stream. When the quality is reduced, then P may be decreased for more FEC packets and more overhead.

Figure 15:
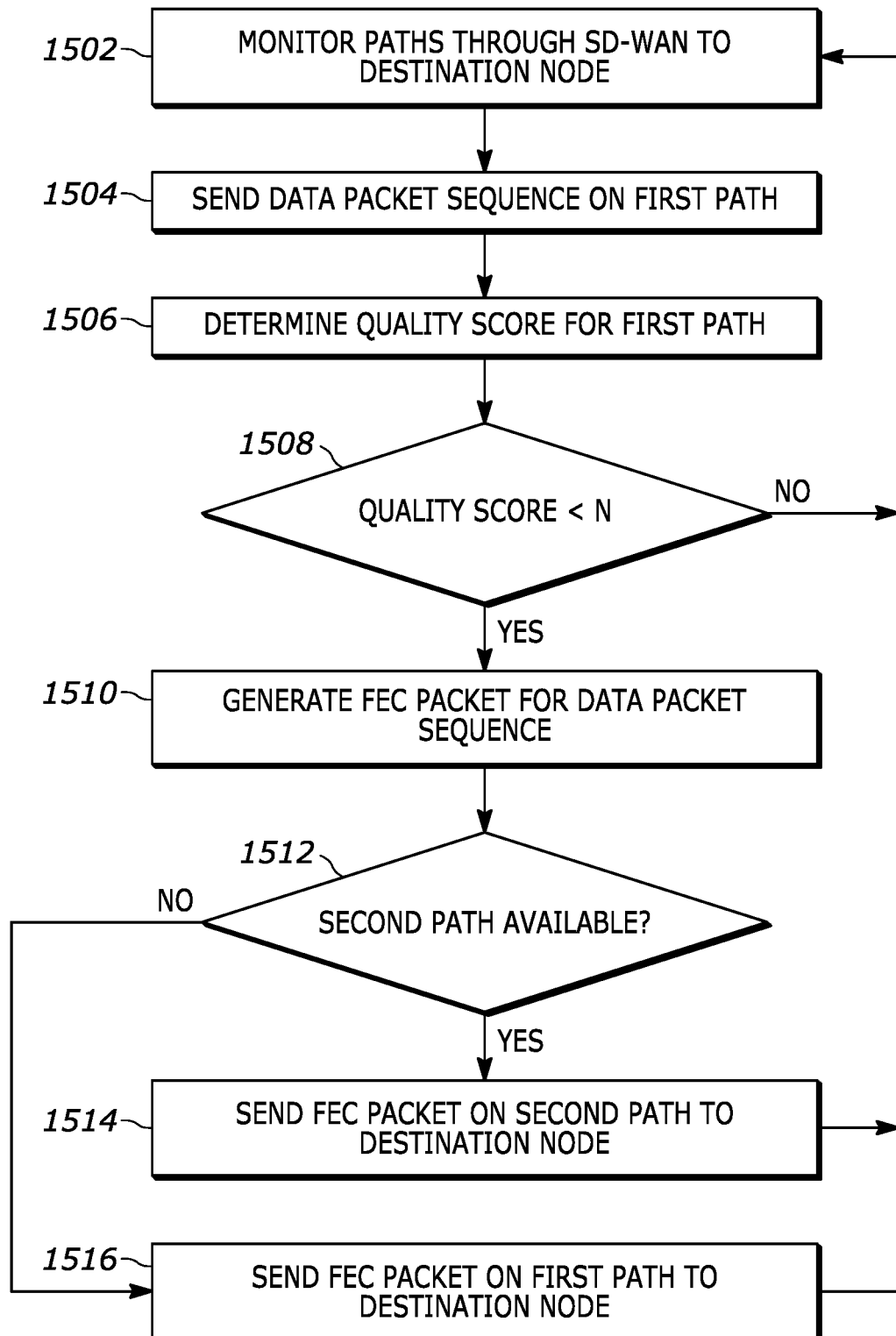
FIG. 15 is a process flow diagram illustrating an example of a method of traffic conditioning using FEC packets on multiple paths, according to embodiments herein.

The process of FIG. 14 may also be combined with processes that use a second path and that send data packets, the FEC packet or both on the second path. FIG. 15 is a process flow diagram to show traffic conditioning through multiple data paths of an SD-WAN using FEC packets in response to changes in a quality score. At 1502 one or more paths through an SD-WAN between a source node such as the client terminal 110 of FIG. 1 and a destination node, such as the client terminal 112 of FIG. 1 are monitored. One or more of the paths are selected for use in sending data from the source to the destination. At 1504 a data sequence is prepared to send on a first path.

At 1506, the monitoring process determines a quality score for the selected path. At 1508, the quality score is compared to a standard such as a packet loss threshold. If the quality of the path is low, e.g., the packet loss is more than a high packet loss threshold, then an FEC packet is generated at 1510. The FEC packet may be sent on the first path as in FIG. 14, on the second path or both. At 1512, if a second path is available then the FEC packet is sent at 1514 on the second path separate from the data packet sequence which is sent on the first path. If the quality score is low and the link utilization on the first link is low, or if there is no second link available, then as in FIG. 14, the FEC packet sequence may be replicated and sent on the first path as well at 1516. In some embodiments, the sender determines link utilization on the second path and sends the FEC packet at 1514 conditional on the second path having a link utilization less than a high threshold $L_H$. In some embodiments, a second quality threshold may be used so that if packet loss is greater than a first threshold, then an FEC packet is generated and sent on one of the paths, preferably an alternate path. If the packet loss is greater than a higher second threshold, then the FEC packet is replicated and sent on a second one of the paths or the same path if only one path is available.

Figure 16:
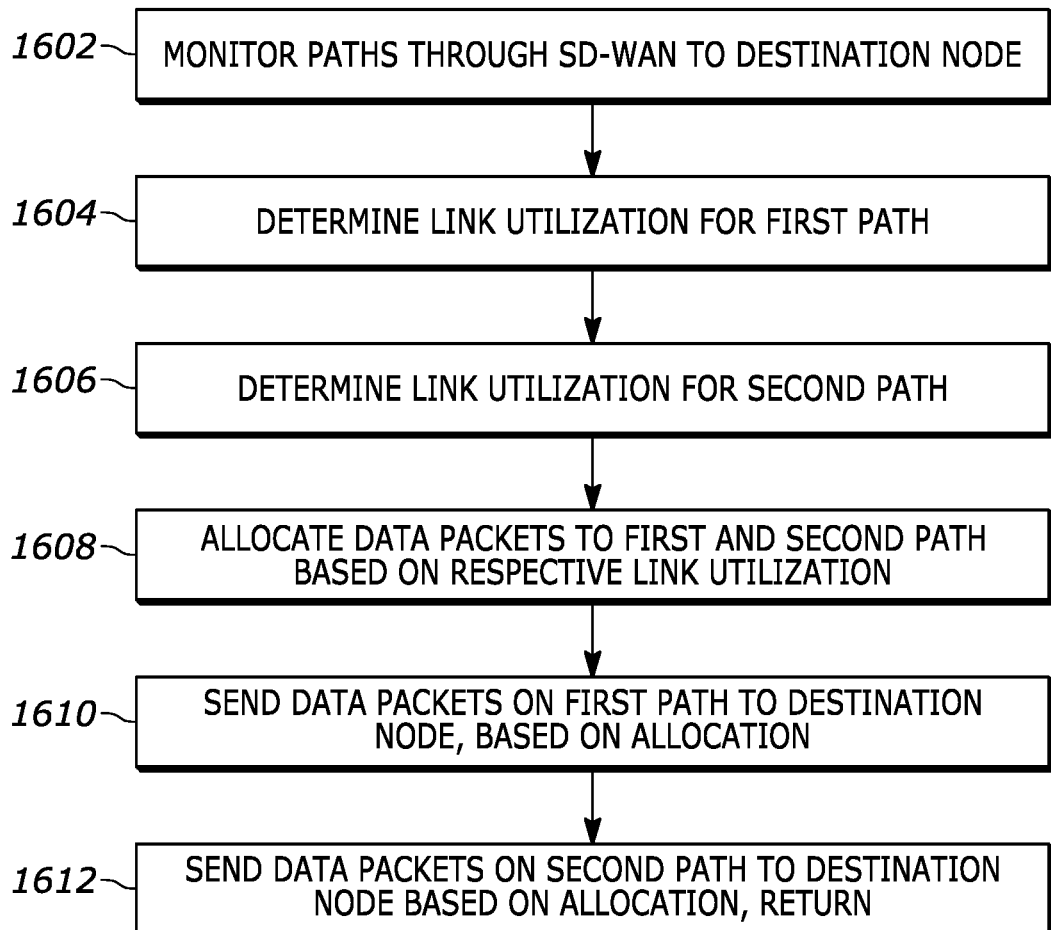
FIG. 16 is a process flow diagram illustrating an example of a method of traffic conditioning using packet striping on multiple paths, according to embodiments herein.

FIG. 16 is a process flow diagram to show traffic conditioning through multiple data paths of an SD-WAN packet striping. At 1602 one or more paths through an SD-WAN between a source node such as the client terminal 110 of FIG. 1 and a destination node, such as the client terminal 112 of FIG. 1 are monitored. Two or more paths are selected for use in sending data from the source to the destination. At 1604 the link utilization on the first path is determined. At 1606 the link utilization for the second path is determined. At 1608 data packets are allocated to the first and second paths based on the link utilization. This may be done by determining an allocation ratio to allocate packets in accord with the ratio, by determining weights for a round robin allocation, or in any other desired way. At 1610 data packets allocated to the first path are sent on the first path to the destination node. At 1612 data packets allocated to the second path are sent on the second path to the destination node.

The path allocations may be adjusted using quality scores, and by putting limits on the links. As a first example, the packet loss on one of the multiple paths is high, then that path may be avoided or the allocation of packets to that path may be reduced. As another example, if packet loss on one of the multiple paths is low, then the allocation to that path may be increased. To accommodate paths with very high utilization, the utilization of each path may be compared to a high threshold $L_H$ so that if the utilization is greater than the high threshold, then the corresponding path is not used. The striping of FIG. 16 may also be combined with the use of FEC packets on one or more paths, replicated FEC packets on one or more paths, varying the number-of-packets per parity and replication of data packets all as described above.

The embodiments disclosed herein can be implemented through at least one software program running on at least one hardware device and performing network management functions to control the network elements. The network elements shown in FIG. 1 and FIG. 2 include blocks which can be at least one of a hardware device, or a combination of hardware device and software module.

It is understood that the scope of the protection for systems and methods disclosed herein is extended to such a program and in addition to a computer readable means having a message therein, such computer readable storage means contain program code means for implementation of one or more steps of the method, when the program runs on a server or mobile device or any suitable programmable device.

Figure 17:
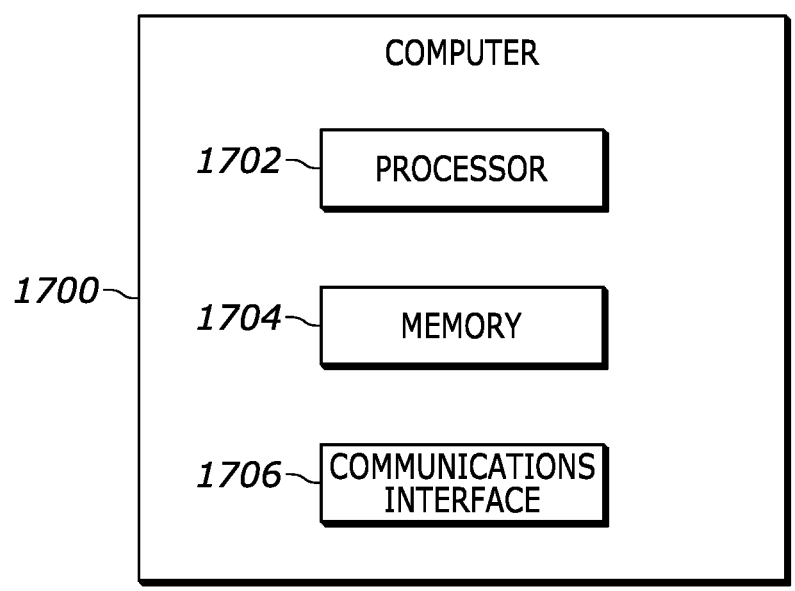
FIG. 17 depicts a computer that includes a processor, memory, and a communications interface, according to embodiments herein.

In an embodiment, the functionality described herein is performed by a computer device that executes computer readable instructions (software). FIG. 17 depicts a computer 1700 that includes a processor 1702, memory 1704, and a communications interface 1706. The processor may include a multifunction processor and/or an application-specific processor. Examples of processors include the PowerPC™ family of processors by IBM and the x86 family of processors by Intel, among others. The memory within the computer may include, for example, a non-transitory storage medium such as read only memory (ROM), flash memory, RAM, and a large capacity permanent storage device such as a hard disk drive. The communications interface enables communications with other computers via, for example, the Internet Protocol (IP). The computer executes computer readable instructions stored in the storage medium to implement various tasks as described above.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware, or any combination thereof. The above-described embodiments of the invention may also be implemented, for example, by operating a computer system to execute a sequence of machine-readable instructions. The instructions may reside in various types of computer readable media. In this respect, another aspect of the present invention concerns a programmed product, comprising computer readable media tangibly embodying a program of machine-readable instructions executable by a digital data processor to perform the method in accordance with an embodiment of the present invention.

The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine-readable storage media, such as a DASD storage (e.g., a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method of conditioning traffic through multiple data paths of a Software-Defined Wide Area Network (SD-WAN), the method comprising:
    monitoring available paths through an SD-WAN to reach a destination node;
    determining a first path quality score for data packets to the destination node on a first path of the available paths;
    determining a second path quality score for data packets to the destination node on a second path of the available paths;
    sending a data packet sequence to the destination node on the first path, wherein each packet of the data packet sequence has a header with a sequence number and an indication as to whether a forward error correction (FEC) packet has been sent for the respective packet;
    generating the FEC packet for a selected number of packets of the data packet sequence;
    attaching a header to the FEC packet that indicates the selected number of packets of the data packet sequence to which the FEC packet pertains;
    sending the FEC packet to the destination node on the second path in response to the first path quality score alone being less than a quality threshold;
    replicating the FEC packet; and
    sending the replicated FEC packet to the destination node on the first path with the data packet sequence in response to the second path quality score alone being less than the quality threshold;
    further comprising determining a link utilization for the first path and wherein sending the FEC packet comprises sending the FEC packet only if the link utilization on the first path is less than a high utilization threshold; and
    further comprising determining a link utilization for the second path and wherein sending an FEC packet comprises sending the FEC packet only if the link utilization on the second path is less than a high utilization threshold.

2. The method of claim 1, further comprising determining a link utilization for the second path and wherein sending the replicated FEC packet comprises sending the replicated FEC packet only if the link utilization on the second path is less than a high utilization threshold.

3. The method of claim 2, further comprising not sending the replicated FEC packet when the link utilization on the second path is greater than a high threshold.

4. The method of claim 1, wherein generating the FEC packet comprises selecting a number of packets of the data packet sequence based on the quality score and wherein generating the FEC packet comprises generating the FEC packet for the selected number of packets.

5. The method of claim 4, further comprising attaching a header to the FEC packet to indicate the selected number of packets.

6. The method of claim 1, further comprising attaching a header to the data packets configured to indicate an FEC packet.

7. The method of claim 1, wherein the FEC packet is an exclusive OR parity packet.

8. The method of claim 1, wherein the quality score is a packet loss score.

9. The method of claim 1, further comprising sending the first data packet sequence to the destination node on the second path with the FEC packet.

10. The method of claim 1, further comprising sending a second data packet sequence to the destination node on the second path and wherein the FEC packet is further configured for use to regenerate a lost packet of at least a portion of the second data sequence.

11. The method of claim 10, wherein sending a second data packet sequence comprises allocating the first and the second data packet sequences to the first and second paths based on link utilization of the first and second paths.

12. A network node comprising:
a processor and memory coupled to the processor, wherein a path monitoring module and a traffic conditioning module are executed on the processor;
the path monitoring module configured to monitor available paths through an SD-WAN to reach a destination node, to determine a first path quality score for packets to the destination node on a first path of the available paths, and to determine a second path quality score for data packets to the destination node on a second path of the available paths; and
the traffic conditioning module configured to send a data packet sequence to the destination node on the first path, wherein each packet of the data packet sequence has a header with a sequence number and an indication as to whether a forward error correction (FEC) packet has been sent for the respective packet, to generate the FEC packet for a selected number of packets of the data packet sequence, to attach a header to the FEC packet that indicates the selected number of packets of the data packet sequence to which the FEC packet pertains, to send the FEC packet to the destination node on the second path in response to the first path quality score alone being less than a quality threshold, and to replicate the FEC packet and send the replicated FEC packet to the destination node on the first path with the data packet sequence in response to the second path quality score alone being less than the quality threshold;
the path monitoring module further configured to determine a link utilization for the first path and wherein sending the FEC packet comprises sending the FEC packet only if the link utilization on the first path is less than a high utilization threshold; and
the path monitoring module further configured to determine a link utilization for the second path and wherein sending an FEC packet comprises sending the FEC packet only if the link utilization on the second path is less than a high utilization threshold.

13. The network node of claim 12, wherein the path monitoring module is further to determine a link utilization for the first path and wherein the traffic conditioning module is further to send the FEC packet also on the first path only if the link utilization on the first path is less than a high utilization threshold.

14. The network node of claim 12, wherein the traffic monitoring module is further to send the replicated FEC packet to the destination node on the second path when the quality score on the first path is below the quality threshold.

15. A non-transitory computer-readable storage medium containing program instructions, wherein execution of the program instructions by the computer causes the computer to perform operations comprising:
monitoring available paths through an SD-WAN to reach a destination node;
determining a first path quality score for data packets to the destination node on a first path of the available paths;
determining a second path quality score for data packets to the destination node on a second path of the available paths;
sending a data packet sequence to the destination node on the first path, wherein each packet of the data packet sequence has a header with a sequence number and an indication as to whether a forward error correction (FEC) packet has been sent for the respective packet;
generating the FEC packet for a selected number of packets of the data packet sequence;
attaching a header to the FEC packet that indicates the selected number of packets of the data packet sequence to which the FEC packet pertains;
sending the FEC packet to the destination node on the second path in response to the first path quality score alone being less than a quality threshold;
replicating the FEC packet; and
sending the replicated FEC packet to the destination node on the first path with the data packet sequence in response to the second path quality score alone being less than the quality threshold;
further comprising determining a link utilization for the first path and wherein sending the FEC packet comprises sending the FEC packet only if the link utilization on the first path is less than a high utilization threshold; and
further comprising determining a link utilization for the second path and wherein sending an FEC packet comprises sending the FEC packet only if the link utilization on the second path is less than a high utilization threshold.

* * * * *